(12) United States Patent
Jung

(10) Patent No.: US 9,971,125 B2
(45) Date of Patent: May 15, 2018

(54) OPTICAL IMAGING SYSTEM

(71) Applicant: Samsung Electro-Mechanics Co., Ltd., Suwon-si (KR)

(72) Inventor: Phil Ho Jung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/138,780

(22) Filed: Apr. 26, 2016

(65) Prior Publication Data

US 2017/0146775 A1    May 25, 2017

(30) Foreign Application Priority Data

Nov. 24, 2015   (KR) .......................... 10-2015-0164972

(51) Int. Cl.
  *G02B 9/62*  (2006.01)
  *G02B 9/60*  (2006.01)
  *G02B 13/00*  (2006.01)

(52) U.S. Cl.
  CPC .......... *G02B 13/0045* (2013.01); *G02B 9/60* (2013.01); *G02B 9/62* (2013.01)

(58) Field of Classification Search
  CPC ... G02B 9/60; G02B 9/62; G02B 9/64; G02B 13/0045
  USPC .................... 359/708, 713, 714, 754–770
  See application file for complete search history.

(56) References Cited

U.S. PATENT DOCUMENTS

| | | | |
|---|---|---|---|
| 2009/0067064 A1 | 3/2009 | Huang et al. | |
| 2013/0016278 A1 | 1/2013 | Matsusaka et al. | |
| 2014/0185141 A1 | 7/2014 | Lee et al. | |
| 2014/0293458 A1 | 10/2014 | Nabeta | |
| 2014/0354872 A1 | 12/2014 | Chen et al. | |
| 2015/0029599 A1 | 1/2015 | Huang | |
| 2015/0055229 A1 | 2/2015 | Park et al. | |
| 2015/0185436 A1 | 7/2015 | Park | |
| 2015/0241662 A1 | 8/2015 | Hashimoto | |
| 2015/0260961 A1 | 9/2015 | Ota et al. | |
| 2016/0131899 A1* | 5/2016 | Jo .......................... | G02B 5/005 348/294 |
| 2016/0161709 A1* | 6/2016 | Hsueh ...................... | G02B 9/62 348/360 |

FOREIGN PATENT DOCUMENTS

| | | |
|---|---|---|
| CN | 103913824 A | 7/2014 |
| CN | 104423019 A | 3/2015 |
| JP | 2011-85733 A | 4/2011 |
| JP | 2013-37202 A | 2/2013 |
| JP | 2015-158569 A | 9/2015 |

(Continued)

OTHER PUBLICATIONS

Korean Office Action issued in counterpart Korean Application No. 10-2015-0164972 dated May 11, 2017 (5 pages in Korean).

(Continued)

*Primary Examiner* — Darryl J Collins
(74) *Attorney, Agent, or Firm* — NSIP Law

(57) ABSTRACT

An optical imaging system includes lenses sequentially disposed from an object side toward an imaging plane and including a refractive power in paraxial regions or edges of the paraxial regions. An object-side surface of a fifth lens of the lenses is planar in a paraxial region and the fifth lens includes a refractive power at an edge of the paraxial region.

29 Claims, 9 Drawing Sheets

(56) References Cited

FOREIGN PATENT DOCUMENTS

| KR | 10-2015-0080680 A | 7/2015 |
|----|-------------------|--------|
| TW | I361296 B | 4/2012 |
| TW | 201504666 A | 2/2015 |

OTHER PUBLICATIONS

Taiwanese Office Action dated Mar. 8, 2017 in corresponding Taiwanese Patent Application No. 105111736 (7 pages in Taiwanese; 9 pages in English).

\* cited by examiner

| FOV = 78.00 | FIRST EMBODIMENT | | | | |
|---|---|---|---|---|---|
| TTL = 5.332 | F number = 1.80 | | f = 4.4850 | | |

| SURFACE NO | | RADIUS OF CURVATURE | THICKNESS /DISTANCE | REFRACTIVE INDEX | ABBE NUMBER | FOCAL LENGTH |
|---|---|---|---|---|---|---|
| S1 | FIRST LENS | 2.0718 | 0.4856 | 1.544 | 56.1 | 8.431 |
| S2 | | 3.4526 | 0.1106 | | | |
| S3 | SECOND LENS | 3.0541 | 0.5392 | 1.544 | 56.1 | 4.555 |
| S4 | | −12.6233 | 0.0250 | | | |
| S5 | STOP | | 0.0000 | | | |
| S6 | THIRD LENS | 12.5889 | 0.2300 | 1.650 | 21.5 | −6.013 |
| S7 | | 2.9866 | 0.4304 | | | |
| S8 | FOURTH LENS | 26.6914 | 0.3550 | 1.650 | 21.5 | 17.395 |
| S9 | | −19.9018 | 0.5822 | | | |
| S10 | FIFTH LENS | Infinity | 0.6951 | 1.650 | 21.5 | – |
| S11 | | Infinity | 0.1146 | | | |
| S12 | SIXTH LENS | 2.3187 | 0.6150 | 1.535 | 55.7 | −8.974 |
| S13 | | 1.4201 | 0.2621 | | | |
| S14 | FILTER | Infinity | 0.2100 | 1.517 | 64.2 | |
| S15 | | Infinity | 0.6770 | | | |
| S16 | IMAGING PLANE | Infinity | | | | |

FIG. 3

| FOV = | 78.40 | SECOND EMBODIMENT | | | |
|---|---|---|---|---|---|
| TTL = | 5.310 | F number = 1.80 | | f = 4.4580 | |
| SURFACE NO | | RADIUS OF CURVATURE | THICKNESS /DISTANCE | REFRACTIVE INDEX | ABBE NUMBER | FOCAL LENGTH |

| SURFACE NO | | RADIUS OF CURVATURE | THICKNESS /DISTANCE | REFRACTIVE INDEX | ABBE NUMBER | FOCAL LENGTH |
|---|---|---|---|---|---|---|
| S1 | FIRST LENS | 2.0652 | 0.4888 | 1.544 | 56.1 | 8.223 |
| S2 | | 3.5016 | 0.1144 | | | |
| S3 | SECOND LENS | 3.1667 | 0.5285 | 1.544 | 56.1 | 4.642 |
| S4 | | −12.0094 | 0.0250 | | | |
| S5 | STOP | Infinity | 0.0000 | | | |
| S6 | THIRD LENS | 11.9651 | 0.2300 | 1.650 | 21.5 | −6.138 |
| S7 | | 2.9947 | 0.4322 | | | |
| S8 | FOURTH LENS | 26.5404 | 0.3551 | 1.650 | 21.5 | 18.254 |
| S9 | | −21.7889 | 0.5566 | | | |
| S10 | FIFTH LENS | Infinity | 0.6951 | 1.650 | 21.5 | – |
| S11 | | Infinity | 0.1146 | | | |
| S12 | SIXTH LENS | 2.2869 | 0.6205 | 1.535 | 55.7 | −9.481 |
| S13 | | 1.4282 | 0.2621 | | | |
| S14 | FILTER | Infinity | 0.2100 | 1.517 | 64.2 | |
| S15 | | Infinity | 0.6770 | | | |
| S16 | IMAGING PLANE | Infinity | | | | |

FIG. 6

| FOV = | 77.50 | THIRD EMBODIMENT | | | |
|---|---|---|---|---|---|
| TTL = | 5.320 | F number = 1.80 | | f = 4.5100 | |
| SURFACE NO | | RADIUS OF CURVATURE | THICKNESS /DISTANCE | REFRACTIVE INDEX | ABBE NUMBER | FOCAL LENGTH |
| S1 | FIRST LENS | 1.9389 | 0.5107 | 1.544 | 56.1 | 6.900 |
| S2 | | 3.6198 | 0.1750 | | | |
| S3 | SECOND LENS (STOP) | 3.7046 | 0.5065 | 1.544 | 56.1 | 5.045 |
| S4 | | −10.2590 | 0.0250 | | | |
| S5 | THIRD LENS | 21.0139 | 0.2300 | 1.650 | 21.5 | −6.512 |
| S6 | | 3.5410 | 0.4549 | | | |
| S7 | FOURTH LENS | 11.4605 | 0.3207 | 1.650 | 21.5 | 27.881 |
| S8 | | 30.2434 | 0.4919 | | | |
| S9 | FIFTH LENS | Infinity | 0.8685 | 1.650 | 21.5 | – |
| S10 | | Infinity | 0.1210 | | | |
| S11 | SIXTH LENS | 1.9953 | 0.4750 | 1.535 | 55.7 | −9.261 |
| S12 | | 1.3053 | 0.2485 | | | |
| S13 | FILTER | Infinity | 0.2100 | 1.517 | 64.2 | |
| S14 | | Infinity | 0.6828 | | | |
| S15 | IMAGING PLANE | Infinity | | | | |

FIG. 9

OPTICAL IMAGING SYSTEM

CROSS-REFERENCE TO RELATED APPLICATION(S)

This application claims the priority and benefit under 35 USC § 119 of Korean Patent Application No. 10-2015-0164972, filed on Nov. 24, 2015 in the Korean Intellectual Property Office, the entire disclosure of which is incorporated herein by reference for all purposes.

BACKGROUND

1. Field

The following description relates to an optical imaging system including lenses.

2. Description of Related Art

Normally, a small camera module is mounted in a portable terminal, such as a mobile device or a tablet. The small camera module includes four or five lenses to realize an optical imaging system having a high level of resolution. However, as a result of a gradual increase in a number of pixels of an image sensor capturing images of a subject in the camera module, an optical imaging system that is able to capture the image of the subject much brighter than an existing optical imaging system is in demand.

Therefore, there is a need to develop an optical imaging system capable of being mounted in the small camera and having an F number of 2.0 or less.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an optical imaging system, including: lenses sequentially disposed from an object side toward an imaging plane and including a refractive power in paraxial regions or edges of the paraxial regions, wherein an object-side surface of a fifth lens of the lenses is planar in a paraxial region and the fifth lens may include a refractive power at an edge of the paraxial region.

A first lens of the lenses may include a positive refractive power.

A second lens of the lenses may include a positive refractive power.

A third lens of the lenses may include a negative positive power.

A fourth lens of the lenses may include a positive refractive power.

A sixth lens of the lenses may include a negative refractive power.

A sixth lens of the lenses may include an aspherical shape in which one or more inflection points are formed on an image-side surface thereof.

The optical imaging system may also include a stop disposed between a second lens and a third lens of the lenses.

$0.05 < Th5/f < 0.25$ may be satisfied, in which Th5 is a thickness of an optical axis center of the fifth lens, and f is an overall focal length of the optical imaging system.

$20 < V1-V3 < 70$ may be satisfied, in which V1 is an Abbe number of a first lens of the lenses, and V3 is an Abbe number of a third lens of the lenses.

$|Sag51/Th5| < 1.0$ may be satisfied, in which Sag51 is a Sag value at an end of an effective diameter of an object-side surface of the fifth lens, and Th5 is a thickness of an optical axis center of the fifth lens.

$-1.5 < f3/f2$ may be satisfied, in which f2 is a focal length of a second lens of the lenses, and f3 is a focal length of a third lens of the lenses.

$0.5 < OAL/f < 2.0$ may be satisfied, in which OAL is a distance from an object-side surface of a first lens of the lenses toward the imaging plane, and f is an overall focal length of the optical imaging system.

$1.6 < n5 < 2.1$ may be satisfied, in which n5 is a refractive index of the fifth lens.

F number $< 2.0$ may be satisfied.

In accordance with an embodiment, there is provided an optical imaging system, including: a first lens including a convex object-side surface; a second lens including a convex object-side surface and a convex image-side surface; a third lens including a convex object-side surface; a fourth lens including a convex object-side surface; a fifth lens including a planar surface on a paraxial region thereof; and a sixth lens including a convex object-side surface, wherein the first to sixth lenses are spaced apart and sequentially disposed from an object side toward an imaging plane.

In accordance with an embodiment, there is provided an optical imaging system, including: a first lens; a second lens; a third lens including a convex object-side surface; a fourth lens including, in a paraxial region, a convex object-side surface; a fifth lens including, in the paraxial region, at least one of a planar object-side surface and a planar image-side surface; and a sixth lens, wherein the third lens, the fourth lens, and the fifth lens may include a same refractive index.

The first lens, the second lens, and the sixth lens may include a same refractive index, different from the refractive index of the third lens, the fourth lens, and the fifth lens.

The first lens may include a convex object-side surface, the second lens may include a convex object-side surface and a convex image-side surface, and the sixth lens may include, in the paraxial region, a convex object-side surface and a concave image-side surface.

The object-side surface of the fourth lens gradually concaves at edge portions thereof.

The image-side surface of the fourth lens is convex in the paraxial region.

The image-side surface of the fourth lens is concave in the paraxial region.

Inflection points may be formed on the object-side surface and the image-side surface of the sixth lens.

The fifth lens excludes a refractive power in a paraxial region thereof.

In accordance with an embodiment, there is provided an optical imaging system, including: a first lens including a positive refractive power; a second lens including a positive refractive power; a third lens including a negative refractive power; a fourth lens including a positive refractive power; and a fifth lens of the lenses including, in a paraxial region, at least one planar side surface excluding a refractive power, and a sixth lens including a negative refractive power, wherein the first through sixth lenses satisfy F number $< 2.0$.

$0.05 < Th5/f < 0.25$ may be satisfied, in which Th5 is a thickness of an optical axis center of the fifth lens, and f is an overall focal length of the optical imaging system.

$20 < V1-V3 < 70$ may be satisfied, in which V1 is an Abbe number of the first lens, and V3 is an Abbe number of the third lens.

$|Sag51/Th5| < 1.0$ may be satisfied, in which Th5 is a thickness of an optical axis center of the fifth lens, and Sag51 is a Sag value at an end of an effective diameter of an object-side surface of the fifth lens.

$-1.5<f3/f2$ may be satisfied, in which f2 is a focal length of the second lens, and f3 is a focal length of the third lens.

$0.5<OAL/f<2.0$ may be satisfied, in which OAL is a distance from the object-side surface of the first lens toward the imaging plane, and f is an overall focal length of the optical imaging system.

$1.6<n5<2.1$ may be satisfied, in which n5 is a refractive index of the fifth lens.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 3 is a table representing characteristics of lenses of the optical imaging system illustrated in FIG. 1;

FIG. 6 is a table representing characteristics of lenses of the optical imaging system illustrated in FIG. 4;

FIG. 9 is a table representing characteristics of lenses of the optical imaging system illustrated in FIG. 7.

Figure 1:
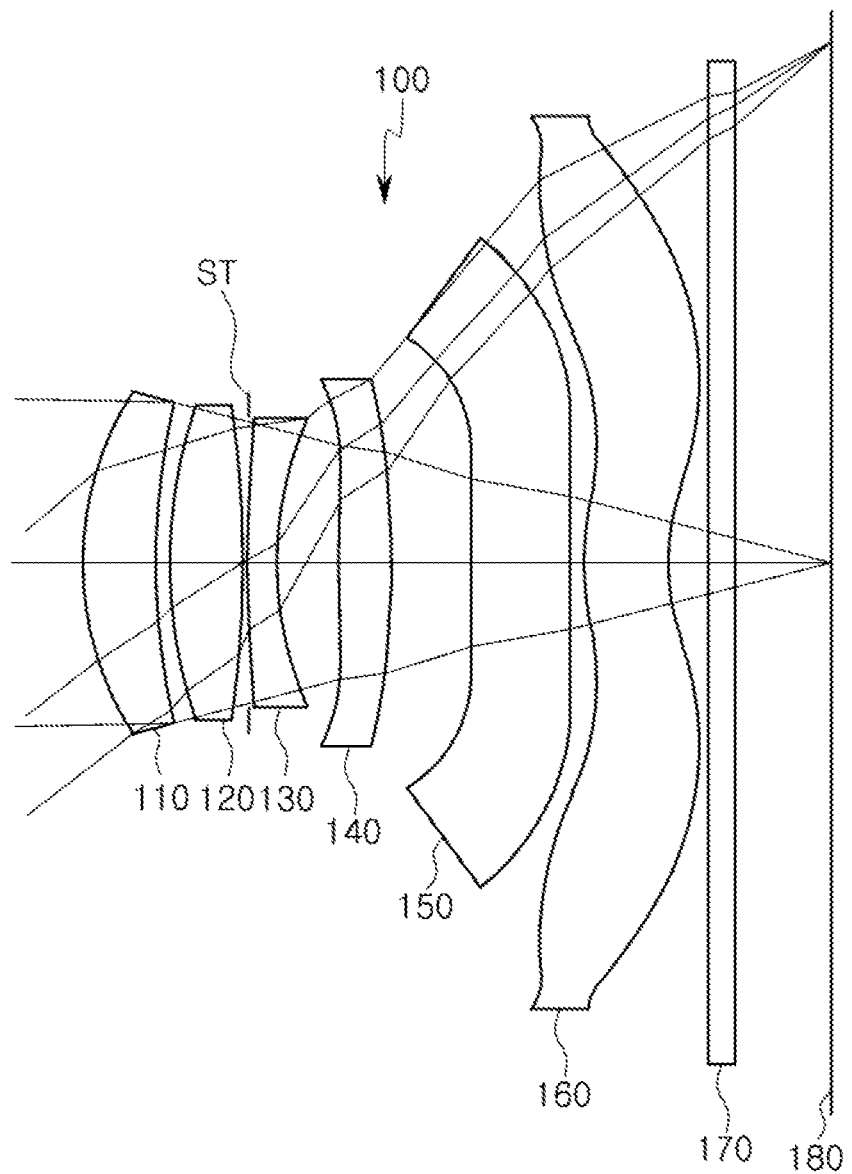
FIG. 1 is a view of an optical imaging system, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower", may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing various embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, various embodiments will be described with reference to schematic views. In the drawings, for example, due to manufacturing techniques and/or tolerances, modifications of the shape shown may be estimated. Thus, embodiments should not be construed as being limited to the particular shapes of regions shown herein, for example, to include a change in shape results in manufacturing. The following embodiments may also be formed by one or a combination thereof.

In addition, in accordance with an embodiment, a first lens refers to a lens closest to an object or a subject from which an image is captured. A sixth lens is a lens closest to an imaging plane or an image sensor. In addition, all of radii of curvature and thicknesses of lenses, an OAL, an Img HT (½ of a diagonal length of the imaging plane), and focal lengths are indicated in millimeters (mm).

A person skilled in the relevant art will appreciate that other units of measurement may be used. Further, in the present specification, all radii of curvature, thicknesses, OALs (optical axis distances from the first surface of the first lens to the image sensor (OALs), a distance on the optical axis between the stop and the image sensor (SLs), image heights (IMGHs) (image heights), and black focus lengths (BFLs) (back focus lengths) of the lenses, an overall focal length of an optical system, and a focal length of each lens are indicated in millimeters (mm). Further, thicknesses of lenses, gaps between the lenses, OALs, and SLs are distances measured based on an optical axis of the lenses.

Further, concerning shapes of the lenses, such shapes are represented in relation to optical axes of the lenses. A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

In addition, in an embodiment, thicknesses and radii of curvatures of lenses are measured in relation to optical axes of the corresponding lenses.

An optical system, according to an embodiment, includes six lenses. As an example, the optical system may include a first lens, a second lens, a third lens, a fourth lens, a fifth lens, and a sixth lens. The lens module may include from four lenses up to six lenses without departing from the scope of the embodiments herein described. In accordance with an illustrative example, the embodiments described of the optical system include six lenses with a refractive power. However, a person of ordinary skill in the relevant art will appreciate that the number of lenses in the optical system may vary, for example, between two to six lenses, while achieving the various results and benefits described hereinbelow. Also, although each lens is described with a particular refractive power, a different refractive power for at least one of the lenses may be used to achieve the intended result.

The first lens has a refractive power. For example, the first lens has a positive refractive power.

One surface of the first lens is convex. For example, an object-side surface of the first lens is convex.

The first lens has an aspherical surface. For example, both surfaces of the first lens are aspherical. The first lens may be formed of a material having high light transmissivity and excellent workability. For example, the first lens is formed of plastic or a polyurethane material. However, a material of the first lens is not limited to plastic. For example, the first lens may be formed of glass.

The second lens has a refractive power. For example, the second lens has a positive refractive power.

At least one surface of the second lens is convex. For example, both surfaces of the second lens are convex.

The second lens has an aspherical surface. For example, an object-side surface of the second lens is aspherical. The second lens is formed of a material having high light transmissivity and excellent workability. For example, the second lens may be formed of plastic or a polyurethane material. However, a material of the second lens is not limited to plastic. For example, the second lens may be formed of glass.

The third lens has a refractive power. For example, the third lens has a negative refractive power.

One surface of the third lens is convex. For example, an object-side surface of the third lens is convex. In an alternative embodiment, the first surface or the object-side surface of the third lens is flat or substantially flat and the second surface or the image-side surface is concave.

The third lens has an aspherical surface. For example, both surfaces of the third lens are aspherical. The third lens is formed of a material having high light transmissivity and excellent workability. For example, the third lens may be formed of plastic or a polyurethane material. However, a material of the third lens is not limited to plastic. For example, the third lens may be formed of glass.

The fourth lens has a refractive power. For example, the fourth lens has a positive refractive power.

One surface of the fourth lens is convex. For example, an object-side surface of the fourth lens is convex. In one example, the object-side surface of the fourth lens is convex in a paraxial region and gradually concaves at edge portions thereof. In another example, the image-side surface of the fourth lens is convex in a paraxial region. In another example, the image-side surface of the fourth lens is concave in a paraxial region.

The fourth lens has an aspherical surface. For example, both surfaces of the fourth lens are aspherical. The fourth lens is formed of a material having high light transmissivity and excellent workability. For example, the fourth lens is formed of plastic or a polyurethane material. However, a material of the fourth lens is not limited to plastic. For example, the fourth lens may be formed of glass.

The fifth lens has refractive power. For example, the fifth lens may have a positive refractive power or a negative refractive power in an edge of a paraxial region thereof.

The fifth lens is partially flat or substantially flat. For example, the fifth lens may be planar in the paraxial region thereof. In one example, the object-side surface of the fifth lens is flat in a paraxial region and gradually concaves at edge portions thereof. In another example, the image-side surface of the fifth lens is flat or substantially flat in a paraxial region and gradually curves, in a convex shape, at edge portions thereof.

The fifth lens has an aspherical surface. For example, both surfaces of the fifth lens are aspherical. The fifth lens is formed of a material having high light transmissivity and excellent workability. For example, the fifth lens is formed of plastic or a polyurethane material. However, a material of the fifth lens is not limited to plastic. For example, the fifth lens may be formed of glass.

The sixth lens has a refractive power. For example, the sixth lens has a negative refractive power.

One surface of the sixth lens is convex. For example, an object-side surface of the sixth lens is convex. The sixth lens has inflection points. For example, one or more inflection points are formed on an object-side surface and an image-side surface of the sixth lens.

The sixth lens has an aspherical surface. For example, both surfaces of the sixth lens are aspherical. The sixth lens is formed of a material having high light transmissivity and excellent workability. For example, the sixth lens may be formed of plastic. However, a material of the sixth lens is not limited to plastic or a polyurethane material. For example, the sixth lens may be formed of glass.

In an embodiment, the image-side surface of the sixth lens is concave in a paraxial region and gradually curves to be convex towards edge portions thereof.

A person of ordinary skill in the relevant art will appreciate that each of the first through sixth lenses may be configured in an opposite refractive power from the configuration described above. For example, in an alternative configuration, the first lens has a negative refractive power, the second lens has a negative refractive power, the third lens has a positive refractive power, the fourth lens has a negative refractive power, the fifth lens no refractive power, and the sixth lens has a positive refractive power.

First to sixth lenses are formed of materials having a refractive index different from that of air. For example, the first to sixth lenses are formed of plastic or glass. At least one of the first to sixth lenses has an aspherical shape. As an example, all of the first to sixth lenses have the aspherical shape. In an example, an aspherical surface of each lens is represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}.$$ [Equation 1]

In an example, c is an inverse of a radius of curvature of the lens, k is a conic constant, r is a distance from a certain point on an aspherical surface of the lens to an optical axis, A to J are aspherical constants, and Z (or SAG) is a distance between the certain point on the aspherical surface of the lens at the distance Y and a tangential plane meeting the apex of the aspherical surface of the lens.

In one embodiment, the optical imaging system includes lenses having the same refractive index. For example, the third to fifth lenses may have the same refractive index. In addition, the first lens, the second lens, and the sixth lens may have the same refractive index, different from the refractive index of the third to fifth lenses.

The optical imaging system includes a stop. The stop is disposed between the second and third lenses. The stop disposed as described above adjusts an amount of light incident to the imaging plane.

The optical imaging system includes a filter. The filter filters a partial wavelength from light incident through the first to sixth lenses. For example, the filter filters an infrared wavelength of the incident light.

The optical imaging system includes an image sensor. The image sensor provides the imaging plane on which light refracted by the lenses may be imaged. For example, a surface of the image sensor forms the imaging plane. The image sensor is configured to realize a high resolution. For example, a unit size of pixels configuring the image sensor may be 1.12 μm or less.

Also, in one embodiment, each of the first to sixth lenses may be separate lenses configured as described above. A distance between lenses may vary. In another embodiment, at least one of the first to sixth lenses may be operatively connected or in contact with another one of the first to sixth lenses.

The optical imaging system satisfies the following Conditional Expressions 1 through 7:

| | |
|---|---|
| 0.05<Th5/f<0.25 | [Conditional Expression 1] |
| 20<V1−V3<70 | [Conditional Expression 2] |
| |Sag51/Th5|<1.0 | [Conditional Expression 3] |
| −1.5<f3/f2 | [Conditional Expression 4] |
| 0.5<OAL/f<2.0 | [Conditional Expression 5] |
| 1.6<n5<2.1 | [Conditional Expression 6] |
| F number<2.0. | [Conditional Expression 7] |

In one example, Th5 is a thickness of an optical axis center of the fifth lens, f is an overall focal length of the optical imaging system, V1 is an Abbe number of the first lens, V3 is an Abbe number of the third lens, Sag51 is a Sag value at an end of an effective diameter of an object-side surface of the fifth lens, f2 is a focal length of the second lens, f3 is a focal length of the third lens, OAL is a distance from the object-side surface of the first lens toward the imaging plane, and n5 is a refractive index of the fifth lens. F number is an angle of convergence in a cone of focusing light emanating from a circular aperture. The F number is defined by an effective focal length of the optical system (f) divided by the optical system's circular entrance pupil diameter (D).

The optical imaging system satisfying the above Conditional Expressions 1 through 7 may be miniaturized, and may realize a high resolution.

Next, optical imaging systems, according to various embodiments, will be described.

An optical imaging system, according to a first embodiment, will be described with reference to FIG. 1.

The optical imaging system 100, according to the first embodiment, includes a plurality of lenses having refractive power. For example, the optical imaging system 100 includes a first lens 110, a second lens 120, a third lens 130, a fourth lens 140, a fifth lens 150, and a sixth lens 160.

In accordance with an example, the object-side surfaces and the image-side surfaces to be described below with respect to each of the first through sixth lenses 110 through 160 are described with respect to the paraxial regions. For instance, for the first lens 110, an object-side surface thereof is convex in the paraxial region and an image-side surface thereof is concave in the paraxial region. Surface regions, on the object-side surface and the image-side surface, which neighbor or are in the vicinity of the paraxial regions may also have the same curvature as the corresponding paraxial regions or may be concave, convex, flat, or substantially flat. The configuration illustrated in FIG. 1 is one illustrative example of the surface regions in the vicinity of the paraxial regions. However, a person skilled in the art will appreciate that different curvatures or flatness may be implemented in the surface regions in the vicinity of the paraxial regions than those illustrated in FIG. 1.

The first lens 110 has a positive refractive power, and an object-side surface thereof is convex and an image-side surface thereof is concave. The second lens 120 has a positive refractive power, and an object-side surface thereof is convex and an image-side surface thereof is convex. The third lens 130 has a negative refractive power, and an object-side surface thereof is convex and an image-side surface thereof is concave. The fourth lens 140 has a positive refractive power, and an object-side surface thereof is convex and an image-side surface thereof is convex. The fifth lens 150 may not have a refractive power in a paraxial region thereof. For example, the fifth lens 150 is planar in the paraxial region of the object-side surface thereof. The sixth lens 160 has a negative refractive power, and an object-side surface thereof is convex and an image-side surface thereof is concave. In addition, inflection points may be formed on both surfaces of the sixth lens 160. For example, the object-side surface of the sixth lens is convex in a paraxial region thereof and concave in a vicinity of the paraxial region. Similarly, the image-side surface of the sixth lens is concave in a paraxial region thereof and convex in a vicinity of the paraxial region.

The optical imaging system 100 includes a stop ST. For example, the stop ST is disposed between the second lens 120 and the third lens 130. The stop ST disposed as described above adjusts an amount of light incident to an imaging plane 180.

The optical imaging system 100 includes a filter 170. For example, the filter 170 is disposed between the sixth lens 160 and the imaging plane 180. The filter 170 disposed as described above filters infrared rays incident to the imaging plane 180.

The optical imaging system 100 includes an image sensor. The image sensor provides the imaging plane 180 on which light refracted through the lenses is imaged. In addition, the image sensor converts an optical signal imaged on the imaging plane 180 into an electrical signal.

Figure 2:
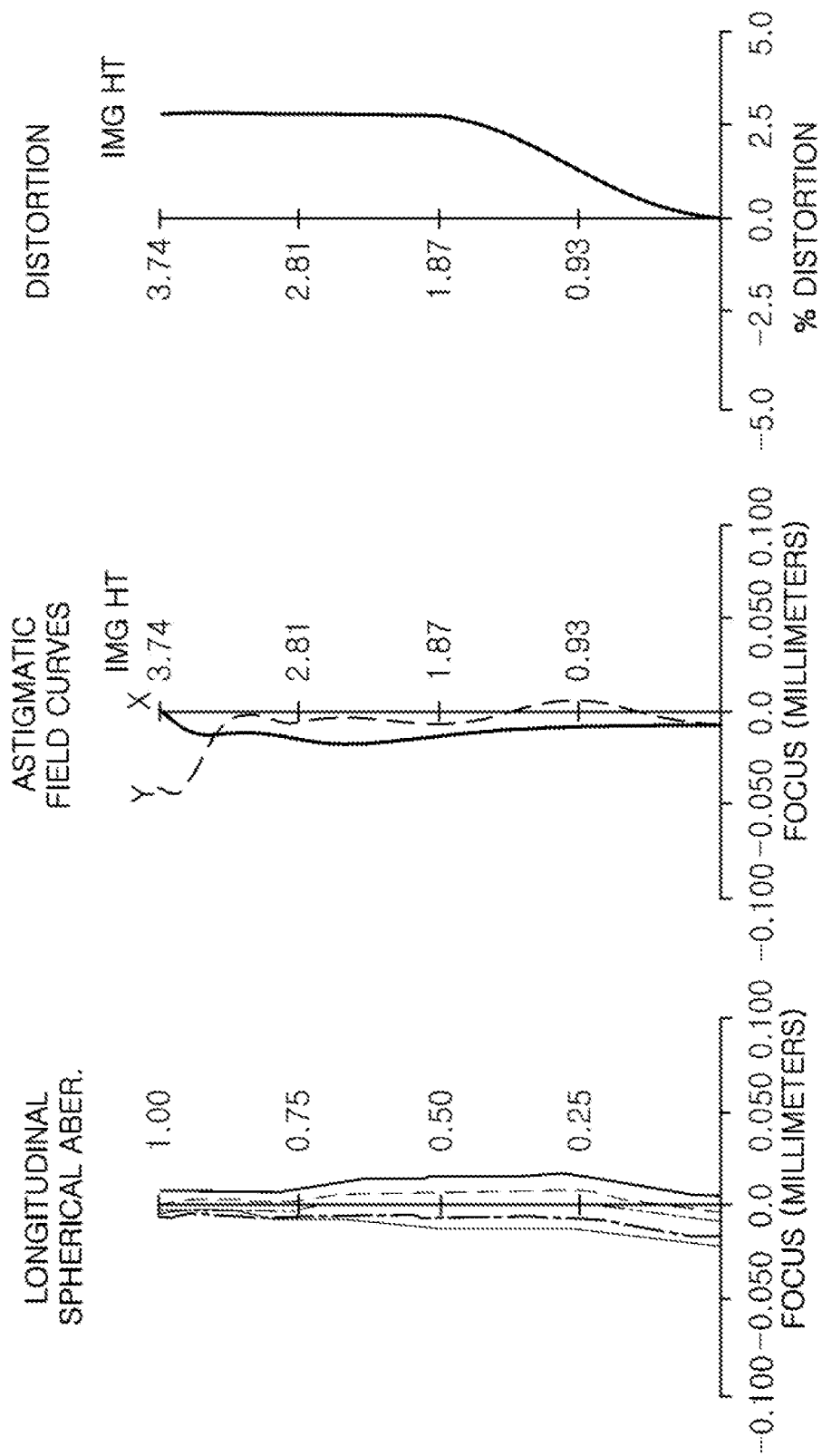
FIG. 2 is graphs representing aberration curves of the optical imaging system illustrated in FIG. 1.

The optical imaging system configured as described above may represent aberration characteristics as illustrated in FIG. 2. FIG. 3 is a table representing characteristics of lenses of the optical imaging system, according to an embodiment.

Figure 4:
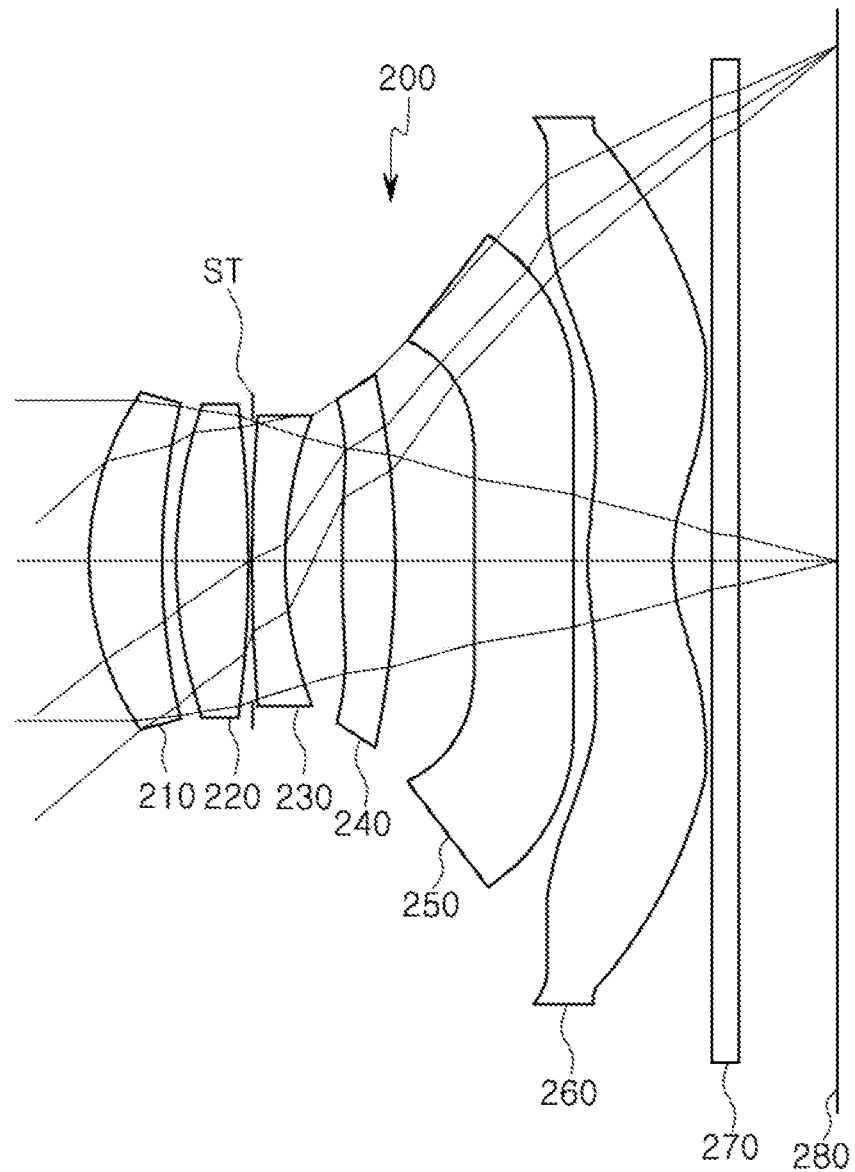
FIG. 4 is a view of an optical imaging system, according to a second embodiment.

An optical imaging system, according to a second embodiment will be described with reference to FIG. 4.

The optical imaging system 200, according to the second embodiment, includes a plurality of lenses having refractive power. For example, the optical imaging system 200 includes a first lens 210, a second lens 220, a third lens 230, a fourth lens 240, a fifth lens 250, and a sixth lens 260.

In accordance with an example, the object-side surfaces and the image-side surfaces to be described below with respect to each of the first through sixth lenses 210 through 260 are described with respect to the paraxial regions. For instance, for the first lens 210, an object-side surface thereof is convex in the paraxial region and an image-side surface thereof is concave in the paraxial region. Surface regions, on the object-side surface and the image-side surface, which neighbor or are in the vicinity of the paraxial regions may also have the same curvature as the corresponding paraxial regions or may be concave, convex, flat, or substantially flat. The configuration illustrated in FIG. 2 is one illustrative example of the surface regions in the vicinity of the paraxial regions. However, a person skilled in the art will appreciate that different curvatures or flatness may be implemented in the surface regions in the vicinity of the paraxial regions than those illustrated in FIG. 2.

The first lens 210 has a positive refractive power, and an object-side surface thereof is convex and an image-side surface thereof is concave. The second lens 220 has a positive refractive power, and an object-side surface thereof may be convex and an image-side surface thereof may be convex. The third lens 230 has a negative refractive power, and an object-side surface thereof is convex and an image-side surface thereof is concave. The fourth lens 240 has a positive refractive power, and an object-side surface thereof is convex and an image-side surface thereof is convex. The fifth lens 250 does not have a refractive power in a paraxial region thereof. For example, the fifth lens 250 is planar in the paraxial region thereof. In one embodiment, the fifth lens 250 is planar in the paraxial region of the object-side surface thereof and the paraxial region of the image-side surface thereof. In another embodiment, the fifth lens 250 is planar in the paraxial region only of the object-side surface thereof. In further another embodiment, the fifth lens 250 is planar in the paraxial region only of the image-side surface thereof. The sixth lens 260 has a negative refractive power, and an object-side surface thereof may be convex and an image-side surface thereof may be concave. In addition, inflection points are formed on both surfaces of the sixth lens 260. For example, the object-side surface of the sixth lens is convex in a paraxial region thereof and concave in the vicinity of the paraxial region. Similarly, the image-side surface of the sixth lens is concave in a paraxial region thereof and convex in the vicinity of the paraxial region.

The optical imaging system 200 includes a stop ST. For example, the stop ST is disposed between the second lens 220 and the third lens 230. The stop ST disposed as described above adjusts an amount of light incident to an imaging plane 280.

The optical imaging system 200 includes a filter 270. For example, the filter 270 is disposed between the sixth lens 260 and the imaging plane 280. The filter 270 disposed as described above filters infrared rays incident to the imaging plane 280.

The optical imaging system 200 includes an image sensor. The image sensor provides the imaging plane 280 on which light refracted through the lenses is imaged. In addition, the image sensor converts an optical signal imaged on the imaging plane 280 into an electrical signal.

Figure 5:
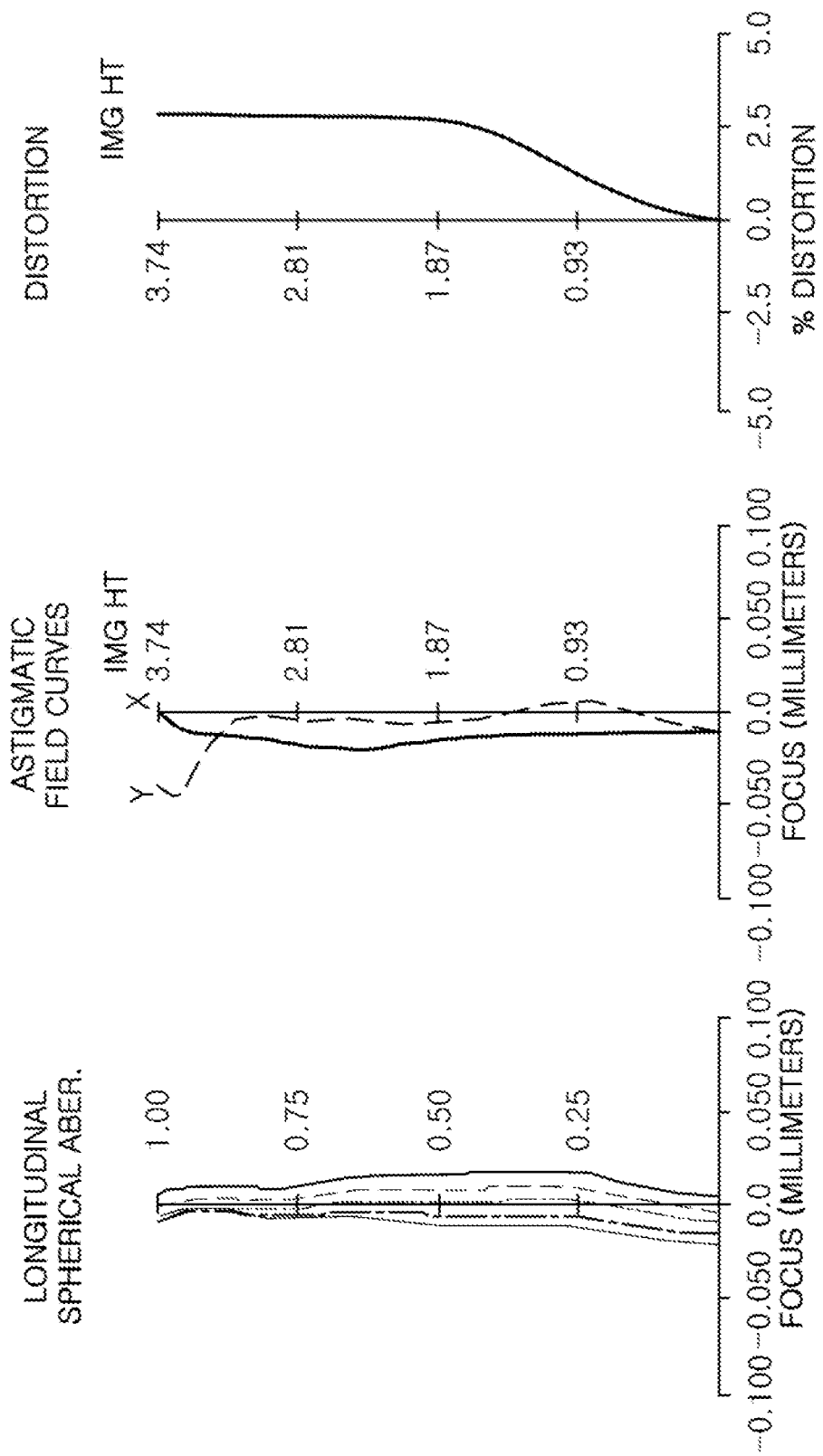
FIG. 5 is graphs representing aberration curves of the optical imaging system illustrated in FIG. 4.

The optical imaging system, configured as described above, represent aberration characteristics as illustrated in FIG. 5. FIG. 6 is a table representing characteristics of lenses of the optical imaging system, according to an embodiment.

Figure 7:
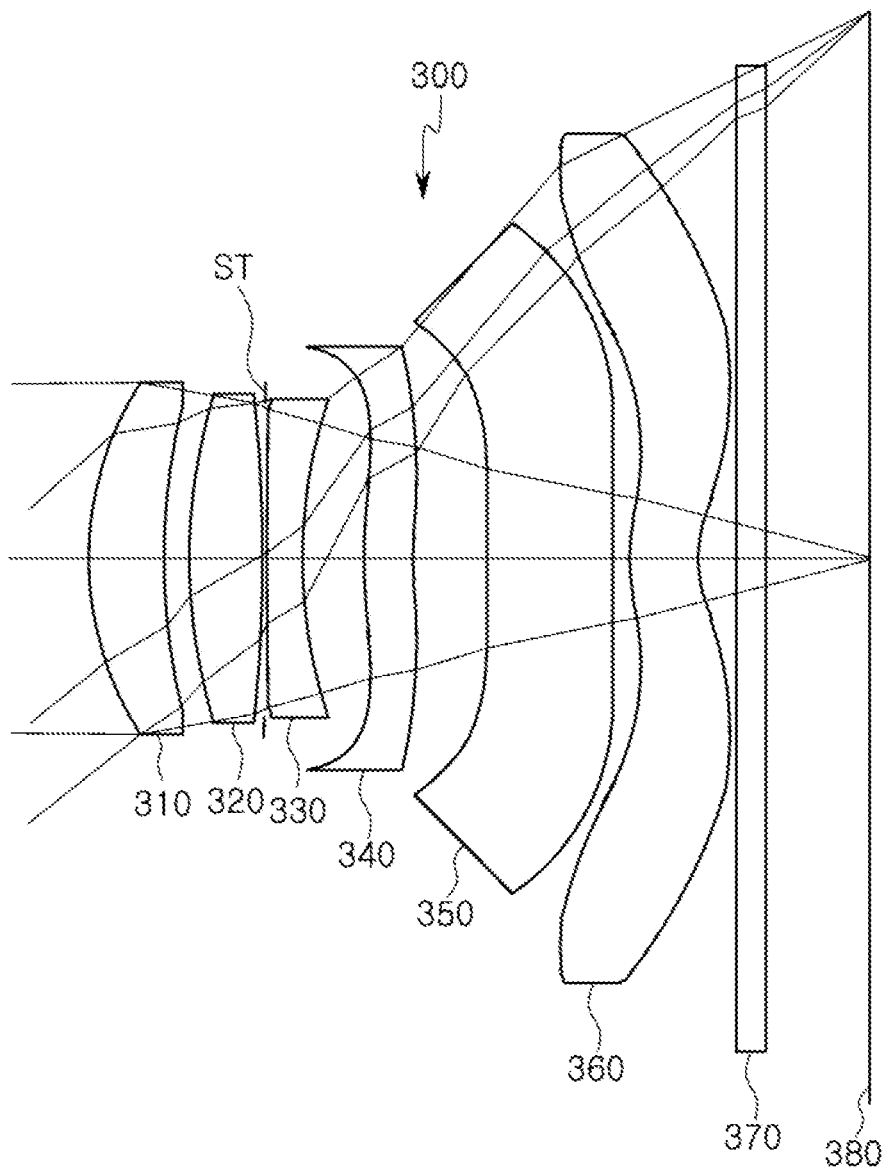
FIG. 7 is a view of an optical imaging system, according to a third embodiment.

An optical imaging system, according to a third embodiment will be described with reference to FIG. 7.

The optical imaging system 300, according to the third embodiment, includes a plurality of lenses having refractive power. For example, the optical imaging system 300 includes a first lens 310, a second lens 320, a third lens 330, a fourth lens 340, a fifth lens 350, and a sixth lens 360.

In accordance with an example, the object-side surfaces and the image-side surfaces to be described below with respect to each of the first through sixth lenses 310 through 360 are described with respect to the paraxial regions. For instance, for the first lens 310, an object-side surface thereof is convex in the paraxial region and an image-side surface thereof is concave in the paraxial region. Surface regions, on the object-side surface and the image-side surface, which neighbor or are in the vicinity of the paraxial regions may also have the same curvature as the corresponding paraxial regions or may be concave, convex, flat, or substantially flat. The configuration illustrated in FIG. 3 is one illustrative example of the surface regions in the vicinity of the paraxial regions. However, a person skilled in the art will appreciate that different curvatures or flatness may be implemented in the surface regions in the vicinity of the paraxial regions than those illustrated in FIG. 3.

The first lens 310 has a positive refractive power, and an object-side surface thereof is convex and an image-side surface thereof is concave. The second lens 320 has a positive refractive power, and an object-side surface thereof is convex and an image-side surface thereof is convex. The third lens 330 has a negative refractive power, and an object-side surface thereof is convex and an image-side surface thereof is concave. The fourth lens 340 has a positive refractive power, and an object-side surface thereof is convex and an image-side surface thereof may be concave. The fifth lens 350 does not have refractive power in a paraxial region thereof. For example, the fifth lens 350 has a plane in the paraxial region thereof. In one embodiment, the fifth lens 350 is a plane in the paraxial region of the object-side surface thereof and the paraxial region of the image-side surface thereof. In another embodiment, the fifth lens 350 is a plane in the paraxial region only of the object-side surface thereof. In further another embodiment, the fifth lens 350 is a plane in the paraxial region only of the image-side surface thereof.

The sixth lens 360 has a negative refractive power, and an object-side surface thereof is convex and an image-side surface thereof is concave. In addition, inflection points are formed on both surfaces of the sixth lens 360. For example, the object-side surface of the sixth lens is convex in a paraxial region thereof and concave in the vicinity of the paraxial region. Similarly, the image-side surface of the sixth lens is concave in a paraxial region thereof and convex in the vicinity of the paraxial region.

The optical imaging system 300 includes a stop ST. For example, the stop ST is disposed between the second lens 320 and the third lens 330. The stop ST disposed as described above adjusts an amount of light incident to an imaging plane 380.

The optical imaging system 300 includes a filter 370. For example, the filter 370 is disposed between the sixth lens 360 and the imaging plane 380. The filter 370 disposed as described above filters infrared rays incident to the imaging plane 380.

The optical imaging system 300 includes an image sensor. The image sensor provides the imaging plane 380 on which light refracted through the lenses is imaged. In addition, the image sensor converts an optical signal imaged on the imaging plane 380 into an electrical signal.

Figure 8:
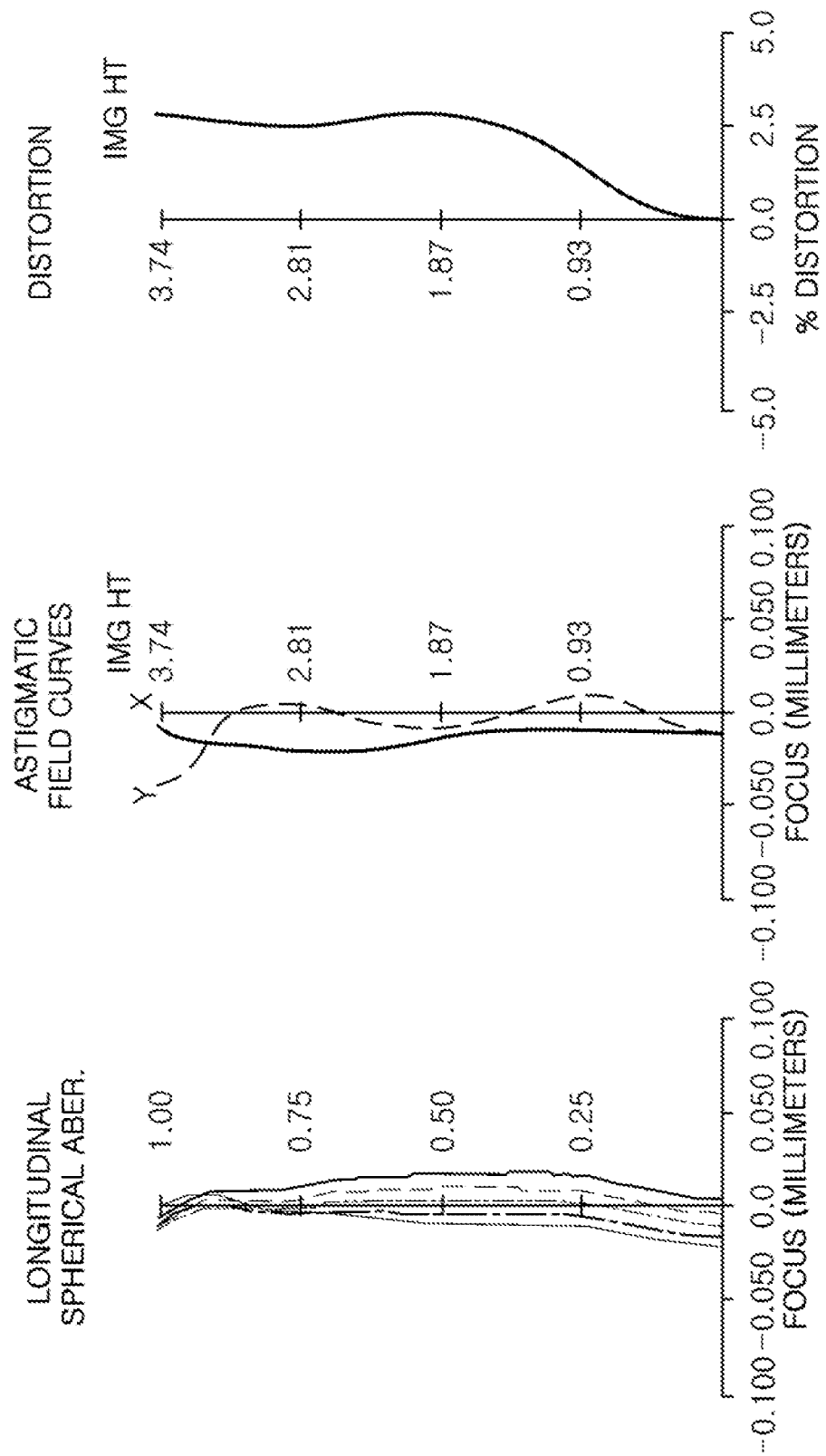
FIG. 8 is graphs representing aberration curves of the optical imaging system illustrated in FIG. 7.

The optical imaging system, configured as described above, represents aberration characteristics as illustrated in FIG. 8. FIG. 9 is a table representing characteristics of lenses of the optical imaging system, according to an embodiment.

Table 1 represents values of Conditional Expressions 1 through 7 of the optical imaging systems according to the first to third embodiments. As seen in Table 1, the optical imaging systems according to the first to third embodiments may satisfy all of numerical according to Conditional Expressions 1 through 7, as described above.

TABLE 1

| Conditional Expression | First Embodiment | Second Embodiment | Third Embodiment |
|---|---|---|---|
| Th5/f | 0.1550 | 0.1559 | 0.1926 |
| V1 − V3 | 34.600 | 34.600 | 34.600 |
| |Sag51/Th5| | 0.8862 | 0.8862 | 0.7093 |
| f3/f2 | −1.3290 | −1.3311 | −1.2995 |
| OAL/f | 1.1888 | 1.1911 | 1.1797 |
| n5 | 1.6500 | 1.6500 | 1.6500 |
| F number | 1.8000 | 1.8000 | 1.8000 |

As set forth above, according to various embodiments, a clear image is realized.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
lenses sequentially disposed from an object side toward an imaging plane and comprising a refractive power in paraxial regions or edges of the paraxial regions,
wherein an object-side surface of a fifth lens of the lenses is planar, excluding a refractive power, in a paraxial region and the fifth lens comprises a refractive power at an edge of the paraxial region, and
wherein |Sag51/Th5|<1.0 is satisfied, in which Sag51 is a Sag value at an end of an effective diameter of an object-side surface of the fifth lens, and Th5 is a thickness of an optical axis center of the fifth lens.

2. The optical imaging system of claim 1, wherein a first lens of the lenses comprises a positive refractive power.

3. The optical imaging system of claim 1, wherein a second lens of the lenses comprises a positive refractive power.

4. The optical imaging system of claim 1, wherein a third lens of the lenses comprises a negative positive power.

5. The optical imaging system of claim 1, wherein a fourth lens of the lenses comprises a positive refractive power.

6. The optical imaging system of claim 1, wherein a sixth lens of the lenses comprises a negative refractive power.

7. The optical imaging system of claim 1, wherein a sixth lens of the lenses comprises an aspherical shape in which one or more inflection points are formed on an image-side surface thereof.

8. The optical imaging system of claim 1, further comprising:
a stop disposed between a second lens and a third lens of the lenses.

9. The optical imaging system of claim 1, wherein 0.05<Th5/f<0.25 is satisfied, in which Th5 is a thickness of an optical axis center of the fifth lens, and f is an overall focal length of the optical imaging system.

10. The optical imaging system of claim 1, wherein 20<V2−V3<70 is satisfied, in which V2 is an Abbe number of a second lens of the lenses, and V3 is an Abbe number of a third lens of the lenses.

11. The optical imaging system of claim 1, wherein −1.5<f3/f2 is satisfied, in which f2 is a focal length of a second lens of the lenses, and f3 is a focal length of a third lens of the lenses.

12. The optical imaging system of claim 1, wherein 0.5<OAL/f<2.0 is satisfied, in which OAL is a distance from an object-side surface of a first lens of the lenses to an imaging plane, and f is an overall focal length of the optical imaging system.

13. The optical imaging system of claim 1, wherein 1.6<n5<2.1 is satisfied, in which n5 is a refractive index of the fifth lens.

14. The optical imaging system of claim 1, wherein F number <2.0 is satisfied.

15. An optical imaging system, comprising:
a first lens comprising a convex object-side surface;

a second lens comprising a convex object-side surface and a convex image-side surface;
a third lens comprising a convex object-side surface;
a fourth lens comprising a convex object-side surface;
a fifth lens comprising a planar surface, excluding a refractive power, on a paraxial region thereof; and
a sixth lens comprising a convex object-side surface,
wherein the first to sixth lenses are spaced apart and sequentially disposed from an object side toward an imaging plane, and
wherein |Sag51/Th5|<1.0 is satisfied, in which Sag51 is a Sag value at an end of an effective diameter of an object-side surface of the fifth lens, and Th5 is a thickness of an optical axis center of the fifth lens.

16. An optical imaging system, comprising:
a first lens;
a second lens;
a third lens comprising a convex object-side surface;
a fourth lens comprising, in a paraxial region, a convex object-side surface;
a fifth lens comprising, in the paraxial region, at least one of a planar object-side surface and a planar image-side surface; and
a sixth lens,
wherein the third lens, the fourth lens, and the fifth lens comprise a same refractive index.

17. The optical imaging system of claim 16, wherein the first lens, the second lens, and the sixth lens comprise a same refractive index, different from the refractive index of the third lens, the fourth lens, and the fifth lens.

18. The optical imaging system of claim 16, wherein the first lens comprises a convex object-side surface, the second lens comprises a convex object-side surface and a convex image-side surface, and the sixth lens comprises, in the paraxial region, a convex object-side surface and a concave image-side surface.

19. The optical imaging system of claim 16, wherein the object-side surface of the fourth lens gradually concaves at edge portions thereof.

20. The optical imaging system of claim 16, wherein the image-side surface of the fourth lens is convex in the paraxial region.

21. The optical imaging system of claim 16, wherein the image-side surface of the fourth lens is concave in the paraxial region.

22. The optical imaging system of claim 16, wherein inflection points are formed on the object-side surface and the image-side surface of the sixth lens.

23. The optical imaging system of claim 16, wherein the fifth lens excludes a refractive power in a paraxial region thereof.

24. An optical imaging system, comprising:
a first lens comprising a positive refractive power;
a second lens comprising a positive refractive power;
a third lens comprising a negative refractive power;
a fourth lens comprising a positive refractive power;
a fifth lens of the lenses comprising, in a paraxial region, at least one planar side surface excluding a refractive power; and
a sixth lens comprising a negative refractive power,
wherein the first through sixth lenses satisfy F number <2.0, and
wherein |Sag51/Th5|<1.0 is satisfied, in which Th5 is a thickness of an optical axis center of the fifth lens, and Sag51 is a Sag value at an end of an effective diameter of an object-side surface of the fifth lens.

25. The optical imaging system of claim 24, wherein 0.05<Th5/f<0.25 is satisfied, in which Th5 is a thickness of an optical axis center of the fifth lens, and f is an overall focal length of the optical imaging system.

26. The optical imaging system of claim 24, wherein 20<V2−V3<70 is satisfied, in which V2 is an Abbe number of the second lens, and V3 is an Abbe number of the third lens.

27. The optical imaging system of claim 24, wherein −1.5<f3/f2 is satisfied, in which f2 is a focal length of the second lens, and f3 is a focal length of the third lens.

28. The optical imaging system of claim 24, wherein 0.5<OAL/f<2.0 is satisfied, in which OAL is a distance from the object-side surface of the first lens to an imaging plane, and f is an overall focal length of the optical imaging system.

29. The optical imaging system of claim 24, wherein 1.6<n5<2.1 is satisfied, in which n5 is a refractive index of the fifth lens.

* * * * *